US009454497B2

(12) United States Patent
Nakajima et al.

(10) Patent No.: US 9,454,497 B2
(45) Date of Patent: Sep. 27, 2016

(54) TECHNOLOGIES FOR SECURE INTER-VIRTUAL-MACHINE SHARED MEMORY COMMUNICATION

(71) Applicant: Intel Corporation, Santa Clara, CA (US)

(72) Inventors: Jun Nakajima, San Ramon, CA (US); Jr-Shian Tsai, Portland, OR (US); Ravi L. Sahita, Beaverton, OR (US); Mesut A. Ergin, Portland, OR (US); Edwin Verplanke, Chandler, AZ (US); Rashmin N. Patel, Tempe, AZ (US); Alexander W. Min, Portland, OR (US); Ren Wang, Portland, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 14/460,530

(22) Filed: Aug. 15, 2014

(65) Prior Publication Data

US 2016/0048464 A1    Feb. 18, 2016

(51) Int. Cl.
*G06F 12/14*     (2006.01)
*G06F 9/455*     (2006.01)
*G06F 21/44*     (2013.01)
*G06F 21/60*     (2013.01)
*G06F 9/50*      (2006.01)
*H04L 12/931*    (2013.01)

(52) U.S. Cl.
CPC ........... *G06F 12/1475* (2013.01); *G06F 9/455* (2013.01); *G06F 9/45558* (2013.01); *G06F 9/50* (2013.01); *G06F 21/44* (2013.01); *G06F 21/606* (2013.01); *G06F 2009/45583* (2013.01); *G06F 2009/45587* (2013.01); *G06F 2212/1052* (2013.01); *H04L 49/70* (2013.01)

(58) Field of Classification Search
CPC ................. G06F 12/1475; G06F 2009/45583; G06F 2009/45587; G06F 21/44; G06F 21/606; G06F 2212/1052; G06F 9/455; G06F 9/45558; G06F 9/50
See application file for complete search history.

(56) References Cited

U.S. PATENT DOCUMENTS

2014/0196029 A1*  7/2014  Kannan ............... G06F 9/45504 718/1

* cited by examiner

*Primary Examiner* — Yong Choe
(74) *Attorney, Agent, or Firm* — Barnes & Thornburg LLP

(57) ABSTRACT

Technologies for secure inter-virtual-machine shared memory communication include a computing device with hardware virtualization support. A virtual machine monitor (VMM) authenticates a view switch component of a target virtual machine. The VMM adds configures a secure memory view to access a shared memory segment. The shared memory segment may include memory pages of a source virtual machine or the VMM. The view switch component switches to the secure memory view without generating a virtual machine exit event, using the hardware virtualization support. The view switch component may switch to the secure memory view by modifying an extended page table (EPT) pointer. The target virtual machine accesses the shared memory segment via the secure memory view. The target virtual machine and the source virtual machine may coordinate ownership of memory pages using a secure view control structure stored in the shared memory segment. Other embodiments are described and claimed.

25 Claims, 7 Drawing Sheets

TECHNOLOGIES FOR SECURE INTER-VIRTUAL-MACHINE SHARED MEMORY COMMUNICATION

BACKGROUND

Telecommunication and other data network functions are increasingly being consolidated into network data centers. For example, cellular base station functions that have historically been distributed among many cell towers may now be consolidated into a virtualized network data center. Network functions such as packet switching and packet filtering typically require processing large volumes of small data packets. However, executing those network functions in one or more virtual machines may introduce overhead associated with isolation boundaries of the virtual machines (e.g., memory or I/O isolation). Overhead may limit throughput and scalability of network function virtualization, particularly for inter-virtual-machine communication of small data packets.

Typical computer processors include hardware support for virtualization operations. Software virtualization includes transparently executing one or more guest operating systems from within a host operating system or virtual machine monitor (VMM). Hardware virtualization features may include an extended privilege model, hardware-assisted support for virtual memory addressing, support for extended memory permissions, and other virtualization features.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
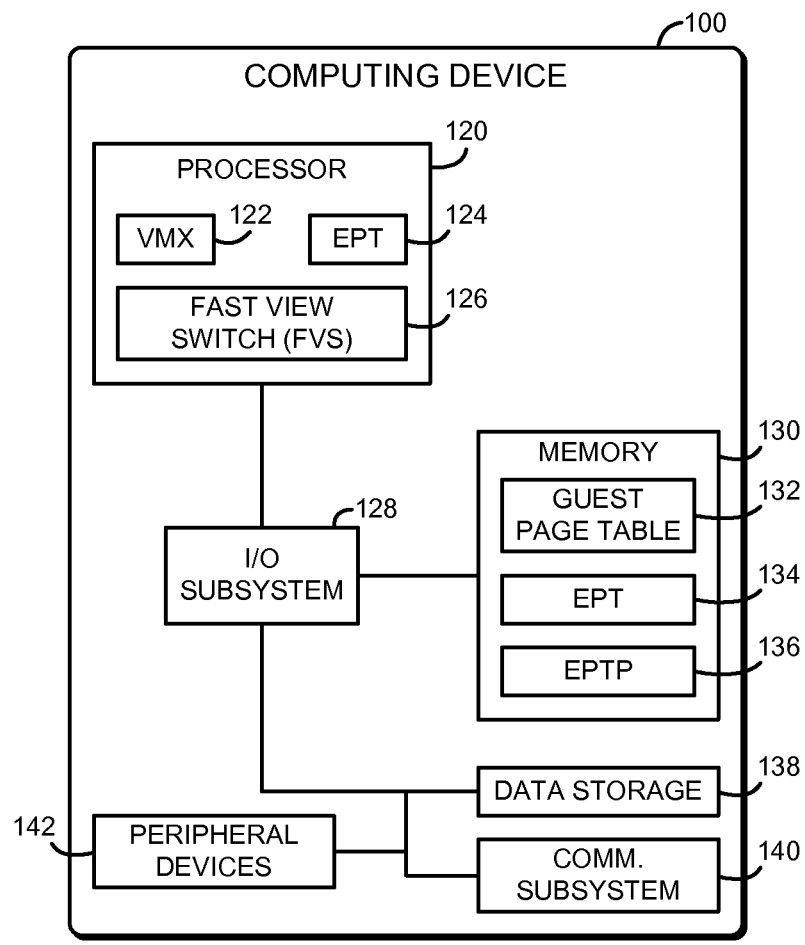
FIG. 1 is a simplified block diagram of at least one embodiment of a computing device for secure inter-virtual-machine shared memory communication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for secure inter-virtual-machine shared memory communication includes a processor 120, an I/O subsystem 128, a memory 130, and a data storage device 138. In use, as described below, the computing device 100 is configured to support secure shared memory communication between two or more virtual machines. In particular, a target virtual machine—a virtual machine that accesses shared memory data of another, source virtual machine—authenticates a view switch component with the virtual machine monitor (VMM). Authentication allows the VMM to control and restrict access to shared memory data. The target virtual machine requests access to a shared memory segment, which may include memory pages of the source virtual machine or shared memory established by the VMM itself. The VMM adds the requested shared memory segment to a secure view extended page table (EPT) of the computing device 100. The target virtual machine may access the shared memory by switching to the secure view EPT using virtualization support of the processor 120 and then executing normal memory accesses to the shared memory segment. The target virtual machine may have access to all the memory of the source virtual machine, or in some embodiments, the source virtual machine may register particular shared memory segments with the VMM.

By communicating via the secure view, the computing device 100 may allow secure access to shared memory without requiring a virtual machine exit, hypercall, or other invocation of the VMM for each access. Thus, the computing device 100 may improve shared memory performance, for example, by eliminating unnecessary context switches to the VMM or by reducing the number of EPT invalidations caused. The improved shared memory performance may make inter-virtual-machine shared memory communication feasible for small data packets (e.g., 64-byte packets) or for larger numbers of processor cores, which in turn may improve performance for network function virtualization. Additionally, the target virtual machine and the source virtual machine may coordinate ownership of shared memory buffers using the shared memory segment. Coordination of memory buffer ownership may improve performance by avoiding unnecessary EPT invalidation.

The computing device 100 may be embodied as any type of device capable of performing inter-virtual-machine shared memory communication and otherwise performing the functions described herein. For example, the computing device 100 may be embodied as, without limitation, a workstation, a server computer, a distributed computing system, a multiprocessor system, a laptop computer, a notebook computer, a tablet computer, a smartphone, a mobile computing device, a wearable computing device, a computer, a desktop computer, a consumer electronic device, a smart appliance, and/or any other computing device capable of inter-virtual-machine shared memory communication. As shown in FIG. 1, the illustrative computing device 100 includes the processor 120, the I/O subsystem 128, the memory 130, and the data storage device 138. Of course, the computing device 100 may include other or additional components, such as those commonly found in a tablet computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Additionally, although illustrated as including a single processor 120, it should be understood that in some embodiments the computing device 100 may include multiple processors 120. The processor 120 includes hardware-based, hardware-assisted, or hardware-accelerated support for virtualization. In particular, the processor 120 includes virtual machine extensions (VMX) support 122, extended page table (EPT) support 124, and fast view switch (FVS) support 126. The VMX support 122 supports virtualized execution of operating systems by providing two modes of execution: VMX-root mode and VMX non-root mode. The VMX-root mode allows executing software to have broad control of the computing device 100 and its hardware resources. Accordingly, a virtual machine monitor (VMM) or hypervisor may execute in VMX-root mode. The VMX non-root mode restricts access to certain hardware instructions while still implementing the ordinary ring/privilege system of the processor 120. Thus, one or more guest virtual machines (VMs) and/or operating systems (OSs) may execute in the VMX non-root mode. Those guest OSs may execute in ring zero, similar to execution without virtualization. The execution of certain hardware instructions and certain other system events may trigger hardware-assisted transitions to VMX-root mode. Those hardware-assisted transitions are commonly known as virtual machine exits (VMExits) or hypercalls. Upon encountering a VMExit, the processor 120 may switch context from the guest VM to the VMM in order to handle the VMExit. Thus, VMExits may impose a performance penalty on virtualized code. The VMX support 122 may be embodied as, for example, Intel® VT-x technology.

The EPT support 124 supports hardware-assisted second-level page address translation. For nonvirtualized workloads (or when operating in VMX-root mode), the processor 120 may provide hardware-assisted translation between virtual memory addresses (also known as linear addresses) to physical memory addresses. The processor 120 may translate memory addresses using one or more page table structures stored in the memory 130 and managed by a host operating system, hypervisor, or VMM. For virtualized workloads (or when operating in VMX non-root mode), the processor 120 supports hardware-assisted translation between virtual memory addresses (used, for example, by applications executing within a guest VM) to guest-physical memory addresses. A guest OS may maintain one or more page table structures in the memory 130 to manage the translation to guest-physical memory addresses. However, a guest-physical memory address may not correspond to an actual physical memory address within the memory 130. The EPT support 124 provides hardware-assisted translation between guest-physical memory addresses to physical memory addresses (also known as host-physical memory addresses). The EPT support 124 may translate memory addresses using one or more extended page table structures stored in the memory 130 and managed by the VMM or hypervisor. Without the EPT support 124, translation between guest-physical memory addresses and physical memory addresses may require one or more VMExits. The EPT support 124 also may support associating access permissions with each guest physical page and/or physical page (e.g., read, write, and/or execute permissions). Permissions violations, which may be known as EPT violations, may generate VMExits that allow the VMM or hypervisor to handle the EPT violation. Additionally or alternatively, in some embodiments, permissions violations may generate a virtualization exception that may be handled by a guest OS. The EPT support 124 may be embodied as, for example, Intel® VT-x technology.

The FVS support 126 allows the processor 120 to quickly and atomically switch between two or more memory views without requiring a VMExit to VMX-root mode. A memory view includes the guest-physical page mapping and associated permissions defined by an EPT and thus may correspond one-to-one with an EPT. The FVS support 126 may support switching memory views by changing a pointer within an in-memory virtual machine control structure (VMCS) to point to a different EPT structure. In some embodiments, the FVS support 126 may allow software in VMX non-root mode to select one of several memory views that have been predefined by software executing within the VMX-root mode. Accordingly, the FVS support 126 may allow a guest VM (e.g., a guest OS or application software executing in the guest VM) to switch between memory views without requiring a potentially expensive context switch to the VMM or hypervisor. The FVS support 126 may be embodied as a specialized processor instruction such as the VMFUNC instruction supported by certain Intel® processors.

The memory 130 may be embodied as any type of volatile or non-volatile memory or data storage capable of performing the functions described herein. In operation, the memory 130 may store various data and software used during operation of the computing device 100 such operating systems, applications, programs, libraries, and drivers. The memory 130 may be subdivided into fixed-sized segments known as pages. Each page may include, for example, 4096 bytes of data. The memory 130 further includes a guest page table 132, one or more extended page tables (EPTs) 134, and one or more extended page table pointers (EPTPs) 136. The guest page table 132 stores mappings between virtual memory pages and guest-physical memory pages. As described above, the guest page table 132 may be used by the processor 120 to translate between virtual memory addresses and guest-physical memory addresses. Each EPT 134 stores mappings between guest-physical memory pages and physical memory pages. As described above, each EPT 134 may be used by the EPT support 124 of the processor 120 to translate between guest-physical memory addresses and physical memory addresses. Each EPT 134 may also include access permissions (e.g., read, write, and/or execute) for each guest-physical page. Both the guest page table 132 and the EPTs 134 may be embodied as one or more in-memory data structures such as arrays, lists, associative arrays, nested or hierarchical arrays, or other data structures. The EPTPs 136 may be used by the processor 120 to identify the currently active EPT 134. Thus, changing an EPTP 136 associated with a guest VM may allow the computing device 100 to quickly change physical memory mappings for the guest VM. As described above, the EPTP 136 may be managed by the FVS support 126.

The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 128 may form a portion of a system-on-a-chip (SoC) and be incorporated, along with the processor 120, the memory 130, and other components of the computing device 100, on a single integrated circuit chip.

The data storage device 138 may be embodied as any type of device or devices configured for short-term or long-term storage of data such as, for example, memory devices and circuits, memory cards, hard disk drives, solid-state drives, or other data storage devices. The computing device 100 may also include a communication subsystem 140. The communication subsystem 140 may be embodied as any communication circuit, device, network interface controller, or collection thereof, capable of enabling communications between the computing device 100 and other remote devices over a network. The communication subsystem 140 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may also include one or more peripheral devices 142. The peripheral devices 142 may include any number of additional input/output devices, interface devices, and/or other peripheral devices. For example, in some embodiments, the peripheral devices 142 may include a display, touch screen, graphics circuitry, keyboard, mouse, speaker system, and/or other input/output devices, interface devices, and/or peripheral devices.

Figure 2:
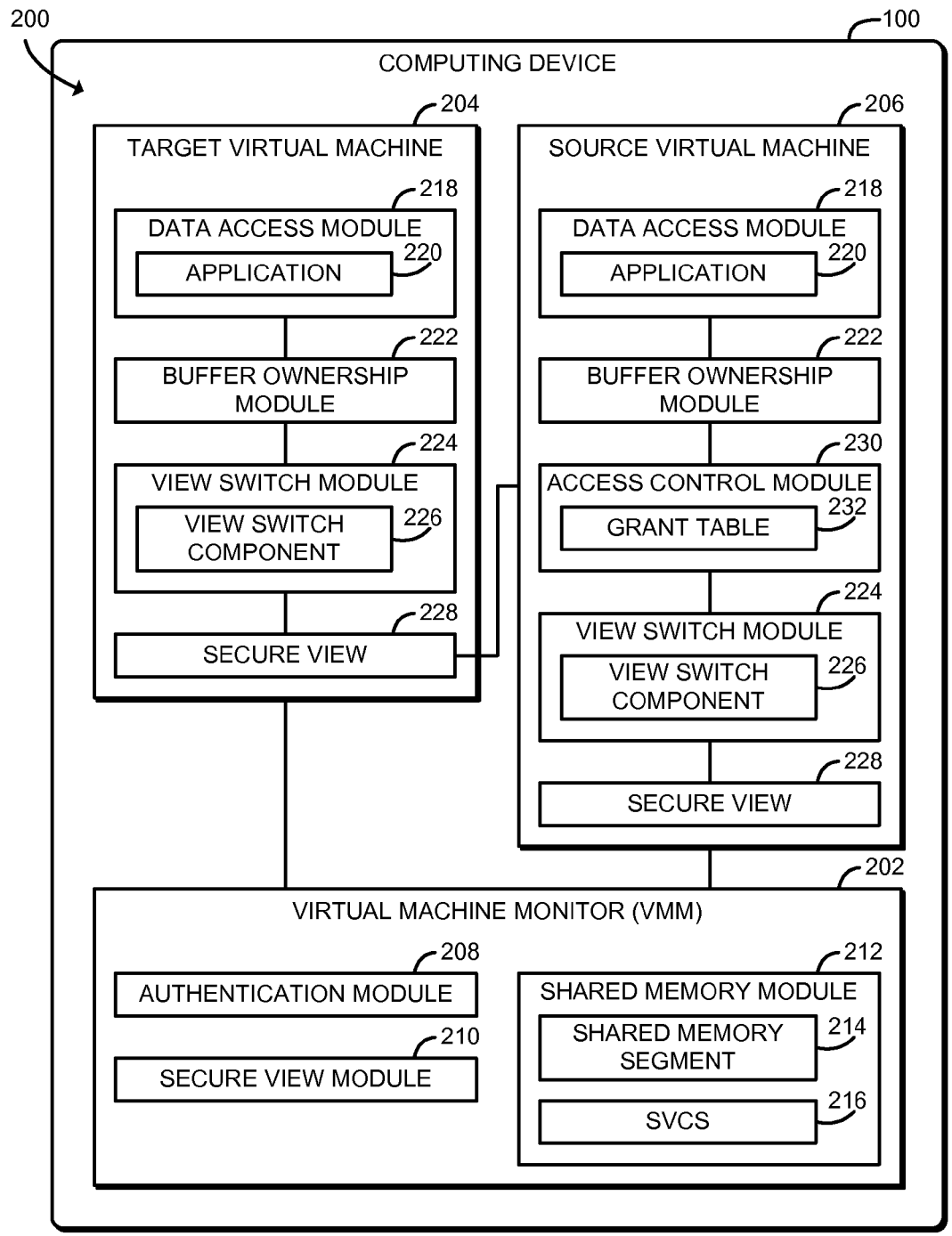
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes a virtual machine monitor (VMM) 202, a target virtual machine 204, and a source virtual machine 206. Although illustrated as including two virtual machines (VMs), it should be understood that other embodiments may include additional VMs. The VMM 202 includes an authentication module 208, a secure view module 210, and a shared memory module 212. The target virtual machine 204 includes a data access module 218, a buffer ownership module 222, a view switch module 224, and a secure view 228. The source virtual machine 206 includes a data access module 218, an access control module 230, a buffer ownership module 222, a view switch module 224, and a secure view 228. The various modules of the environment 200 may be embodied as hardware, firmware, software, or a combination thereof. For example, each of the modules, logic, and other components of the environment 200 may form a portion of, or otherwise be established by, the processor 120 or other hardware components of the computing device 100.

The authentication module 208 of the VMM 202 is configured to authenticate view switch components 226 of the target virtual machine 204 and/or the source virtual machine 206. The authentication module 208 may perform any appropriate authentication process capable of determining whether a view switch component 226 is trustworthy, such as verifying one or more digital signatures or credentials associated with the view switch component 226. The view switch component 226 may be embodied as any guest operating system kernel, kernel module, driver, interface, user-space application, or other component that may be used to switch memory views and thereby access the secure view 228. After authentication, the view switch component 226 may be capable of switching to the secure view 228 without further interaction with the VMM 202. Thus, authentication of the view switch component 226 may protect the security, privacy, and/or integrity of the secure view 228.

The secure view module 210 of the VMM 202 is configured to configure the secure view 228 to allow access to a shared memory segment if the view switch component 226 is successfully authenticated. The secure view 228 defines a physical memory map of the computing device 100 used by the target virtual machine 204 and/or the source virtual machine 206. For example, the secure view 228 may be configured by modifying one or more EPTs 134 of the computing device 100. Thus, the secure view 228 may allow the target virtual machine 204 to directly access physical memory pages associated with the source virtual machine 206 and/or the VMM 202 using ordinary memory access instructions.

The shared memory module 212 of the VMM 202 is configured to establish a shared memory segment 214 that may be accessed via the secure view 228 by the target virtual machine 204 and/or the source virtual machine 206. The shared memory segment 214 may be established, for example, on the heap of the VMM 202. The shared memory segment 214 may be used for secure inter-virtual-memory communication between the virtual machines 204, 206 and/or the VMM 202. In some embodiments, the shared memory module 212 may establish one or more secure view control structures (SVCSs) 216. In particular, the shared memory module 212 may establish an SVCS 216 for each secure view 228. Each SVCS 216 may be included within the shared memory segment 214 or established separately. As described further below, the SVCS 216 may be used by the virtual machines 204, 206 to coordinate transfer of ownership of memory buffers.

The view switch module 224 of the target virtual machine 204 and/or the source virtual machine 206 is configured to switch from a default memory view to the secure view 228 without generating a virtual machine exit (VMExit) event. The view switch module 224 may use the fast view switch support 126 of the processor 120 to switch views without generating a VMExit event. As described above, the view switch module 224 may include a view switch component 226 that performs the view switch. The view switch component 226 may be authenticated by the VMM 202 prior to switching to the secure view 228.

The buffer ownership module 222 of the target virtual machine 204 and/or the source virtual machine 206 is configured to coordinate the transfer of ownership of memory buffers from the source virtual machine 206 to the target virtual machine 204, using the SVCS 216 established by the VMM 202. In particular, ownership of memory buffers within the secure view 228 may be transferred from the source virtual machine 206 to the target virtual machine 204, and the buffers may be processed by the target virtual machine 204 after it receives ownership of those buffers. When the secure view 228 has been filled beyond a predefined capacity, the source virtual machine 206 may reclaim buffers that have already been processed by the target virtual machine 204, and the VMM 202 may clear the secure view 228 and invalidate the EPT 134.

The data access module 218 of the target virtual machine 204 and/or the source virtual machine 206 is configured to access data in the shared memory segment. The data access module 218 may read data included in one or more shared memory buffers, write data into one or more shared memory buffers, or access data in the shared memory segment 214 established by the VMM 202. The data access module 218 may include one or more applications 220 that perform the data access. The applications 220 may include network function applications, such as routers, firewalls, virtual switches, middleboxes, or other virtual network appliances. Thus, the accessed shared memory buffers may include receive queues, transmit queues, network packet buffers, or other network I/O data.

The access control module 230 of the source virtual machine 206 is configured to register the shared memory segment with the VMM 202. Registering the shared memory segment allows the source virtual machine 206 to control access to particular segments of its own memory space. The access control module 230 may maintain a grant table 232. The grant table 232 includes references to the guest-physical pages of the source virtual machine 206 that are to be shared with the target virtual machine 204.

Figure 3:
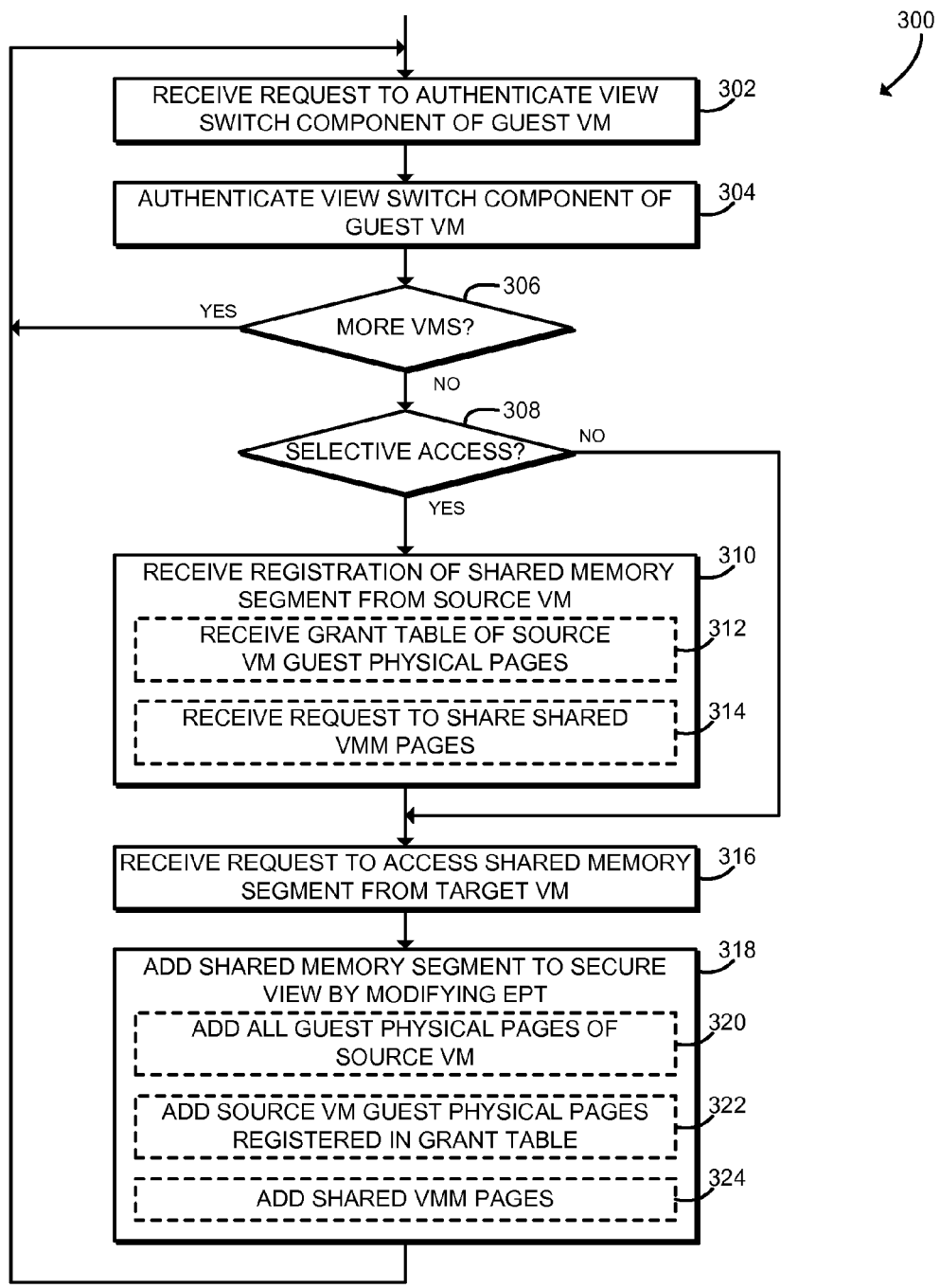
FIG. 3 is a simplified flow diagram of at least one embodiment of a method for secure inter-virtual-machine shared memory communication management that may be executed by the computing device of FIGS. 1 and 2.

Referring now to FIG. 3, in use, the computing device 100 may execute a method 300 for managing secure inter-virtual-machine shared memory communication. The method 300 may be executed by the VMM 202 and thus may execute in VMX-root mode with full access to the computing device 100, including the ability to manage the EPTs 134. The method 300 begins in block 302, in which the computing device 100 receives a request to authenticate the view switch component 226 of a virtual machine 204, 206. The virtual machines 204, 206 request authentication of the view switch component 226 prior to being granted access to the secure view 228. The virtual machines 204, 206 may request authentication by generating a VMExit, a hypercall, or otherwise invoking the VMM 202.

In block 304, the computing device 100 authenticates the requested view switch component 226. The view switch component 226 may be embodied as any guest operating system kernel, kernel module, driver, interface, user-space application, or other component that may be used to switch memory views and thereby access the secure view 228. The computing device 100 may authenticate the view switch component 226 using any technique for validating, verifying, attesting, or otherwise determining that the view switch component 226 is authorized and/or has not been tampered with. For example, the computing device 100 may verify one or more digital signatures or credentials associated with the view switch component 226. If the view switch component 226 is not verified, the computing device 100 may generate an error message or otherwise refuse to allow the unverified view switch component 226 to enable access to the secure view 228.

In block 306, the computing device 100 determines whether additional virtual machines 204, 206 should have view switch components 226 authenticated. For example, multiple target virtual machines 204 may request authentication to access shared memory. As another example, both a target virtual machine 204 and a source virtual machine 206 may request authentication to communication over a secure channel using the shared memory segment 214 established by the VMM 202. If additional VMs should be authenticated, the method 300 loops back to block 302. If no additional VMs should be authenticated, the method 300 advances to block 308.

In block 308, the computing device 100 determines whether to allow the source virtual machine 206 to selectively allow access to shared memory pages. If not, the method branches ahead to block 316, described below. If selective access is to be allowed, the method 300 advances to block 310.

In block 310, the computing device 100 receives a registration of the shared memory segment from the source virtual machine 206. The registration describes the guest-physical memory pages, segments, or other regions that are to be shared from the source virtual machine 206 to the target virtual machine 204. The source virtual machine 206 may register the shared memory segment with the VMM 202 using any appropriate technique, including executing a VMExit or a hypercall, writing to guest-physical memory of the source virtual machine 206, or otherwise invoking the VMM 202. In some embodiments, in block 312 the computing device 100 may receive the grant table 232 from the source virtual machine 206. The grant table 232 identifies guest-physical pages that should be shared with the target virtual machine 204. Because the grant table 232 is located in and references guest-physical pages of the source virtual machine 206, the source virtual machine 206 may generate the grant table 232 without invoking the VMM 202. Additionally, the VMM 202 may process the grant table 232 in-place within the memory 130; that is, without creating an additional copy of the grant table 232.

In some embodiments, in block 314, the computing device 100 may receive a request from the source virtual machine 206 to share the shared memory segment 214 established by the VMM 202. The source virtual machine 206 may generate the request using any appropriate format. For example, the source virtual machine 206 may request access to the shared memory segment 214 by updating the grant table 232 to identify pages stored within the secure view 228. Thus, in those embodiments, the computing device 100 may have previously authenticated the view switch component 226 of the source virtual machine 206.

In block 316, the computing device 100 receives a request from the target virtual machine 204 to access a shared memory segment. The target virtual machine 204 may request access to shared memory pages of the source virtual machine 206 and/or to the shared memory segment 214 established by the VMM 202. The target virtual machine 204 may request access by generating a VMExit, a hypercall, or otherwise invoking the VMM 202.

In block 318, the computing device 100 adds the requested shared memory segment to the secure view 228 of the target virtual machine 204 by modifying the appropriate EPT 134. After modifying the EPT 134, guest-physical pages of the target virtual machine 204 are mapped to physical memory pages corresponding to the requested shared memory segment. Thus, kernel- and/or user-mode software executed by the target virtual machine 204 may access those pages through the virtual memory space of the target virtual machine 204. In some embodiments, in block 320 the computing device 100 may add all guest-physical pages of the source virtual machine 206 to the secure view EPT 134. Thus, in those embodiments, the target virtual machine 204 may be granted full access to all data of the source virtual machine 206, including application data, kernel data, and I/O data such as transmit queues, receive queues, and packet data. Additionally or alternatively, in some embodiments, some or all of the shared data of the source virtual machine 206 may be directly mapped to hardware of the computing device 100, such as to the communication subsystem 140. For example, one or more buffers of the source virtual machine 206 may be mapped directly to a NIC, port, virtual function, or other component of the communication subsystem 140 using a virtualization technology such as Intel® VT-d technology or single root I/O virtualization (SR-IOV).

In some embodiments, in block 322 the computing device 100 may add guest-physical pages of the source virtual machine 206 that have been previously registered by the source virtual machine 206. For example, the computing device 100 may inspect the grant table 232 of the source virtual machine 206 and add all of the guest-physical pages identified in the grant table 232. Thus, the source virtual machine 206 may limit access to its guest-physical memory pages. In some embodiments, in block 324, the computing device 100 may add the shared memory segment 214 established by the VMM 202 to the secure view EPT 134.

After modifying the secure view EPT 134, the method 300 loops back to block 302 to authenticate additional virtual machines. As further described below in connection with FIGS. 5 and 6, after modifying the secure view EPT 134, the target virtual machine 204 and/or the source virtual machine 206 may access the shared memory pages without generating further VMExits, hypercalls, or otherwise invoking the VMM 202.

Figure 4:
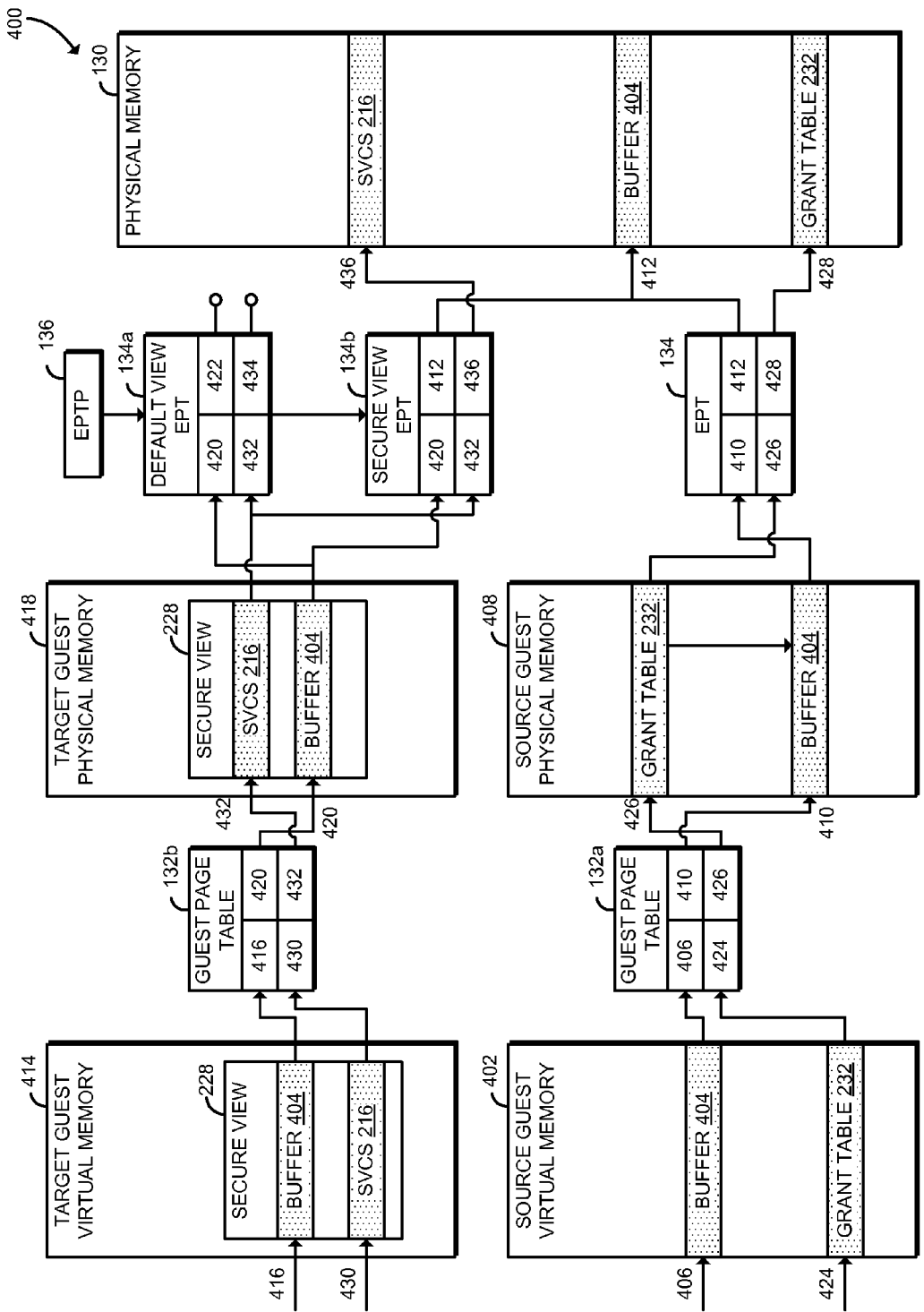
FIG. 4 is a schematic diagram illustrating virtual memory page table structures that may be established by the computing device of FIGS. 1 and 2.

Referring now to FIG. 4, the schematic diagram 400 illustrates potential embodiments of page table structures that may be established to provide inter-virtual-machine shared memory communication. Block 402 illustrates the virtual memory layout of the source virtual machine 206. For illustration, the source virtual machine 206 includes a single buffer 404. The buffer 404 may be embodied as any shared memory data structure. For example, the buffer 404 may include or otherwise be embodied as a transmit queue, receive queue, or other network I/O data structure. As shown, the buffer 404 is located at a virtual page 406. Block 408 illustrates the guest-physical layout of the source virtual machine 206. As shown, the buffer 404 is located at a guest-physical page 410. The guest page table 132a, which may be maintained by a guest OS of the source virtual machine 206, maps between virtual pages of the virtual memory 402 to guest-physical pages of the guest physical memory 408. As shown, the guest page table 132a maps the virtual page 406 to the guest-physical page 410.

The diagram 400 further illustrates the layout of the physical memory 130. As shown, the buffer 404 is located at a physical page 412 within the physical memory 130. The extended page table (EPT) 134, which is maintained by the VMM 202, maps between guest-physical pages of the guest-physical memory 408 to physical pages of the physical memory 130. As shown, the EPT 134 maps the guest-physical page 410 to the physical page 412.

Block 414 illustrates the virtual memory layout of the target virtual machine 204. As shown, the target virtual machine 204 includes the secure view 228, illustrated as a contiguous block of virtual memory. In other embodiments, the secure view 228 may be non-contiguous, sparse, or otherwise distributed within the virtual memory 414. As described above, the target virtual machine 204 may access data within the secure view 228 only after authenticating its view switch component 226 with the VMM 202. As shown, the buffer 404 from the source virtual machine 206 is mapped to a virtual page 416 within the secure view 228. Block 418 illustrates the guest-physical layout of the target virtual machine 204. As shown, the buffer 404 is located at a guest-physical page 420 within the secure view 228. The guest page table 132b, which may be maintained by a guest OS of the target virtual machine 204, maps between virtual pages of the virtual memory 414 to guest-physical pages of the guest physical memory 418. As shown, the guest page table 132b maps the virtual page 416 to the guest-physical page 420.

The VMM 202 manages a default view EPT 134a and a secure view EPT 134b. As shown, the default view EPT 134a maps the guest-physical page 420 to a physical page 422. The physical page 422 does not include any usable data. For example, the physical page 422 may be zeroed or otherwise cleared of data. In some embodiments, the default view EPT 134a may include permissions set to restrict access to the physical page 422. Thus, any accesses to the guest-physical page 420 (or the virtual page 416) associated with the buffer 404 from the default view do not resolve to the physical page 412 that contains the buffer 404. In contrast, the secure view EPT 134b maps the guest-physical page 420 to the physical page 412. Thus, accesses to the guest-physical page 420 (or the virtual page 416) associated with the buffer 404 from the secure view 228 do access the physical page 412 that contains the buffer 404.

As shown, the EPT pointer 136 may point to either the default view EPT 134a or the secure view EPT 134b. The processor 120 references the EPT pointer 136 when resolving guest-physical pages to physical pages. As described above, the EPT pointer 136 may be switched or otherwise modified by guest software such as the view switch component 226, using the FVS support 126, for example by executing the VMFUNC processor instruction. Thus, the target virtual machine 204 may control access to the buffer 404 by modifying the EPT pointer 136 without invoking the VMM 202.

As described above, in some embodiments the source virtual machine 206 may control access to guest-physical memory pages by identifying pages to be shared in the grant table 232. In the illustrative embodiment, the grant table 232 is located at a virtual page 424 of the virtual memory 402 and at a guest-physical page 426 of the guest-physical memory 408. As shown, the grant table 232 references the buffer 404, for example by storing the guest-physical page number of the buffer 404 (e.g., guest-physical page 410). The grant table 232 is further located at the physical page 428 within the physical memory 130. As described above, the VMM 202 may add the reference to the buffer 404 to the secure view EPT 134b if the buffer 404 is referenced by the grant table 232. As illustrated, the grant table 232 itself may not be accessible to the target virtual machine 204.

Figure 5:
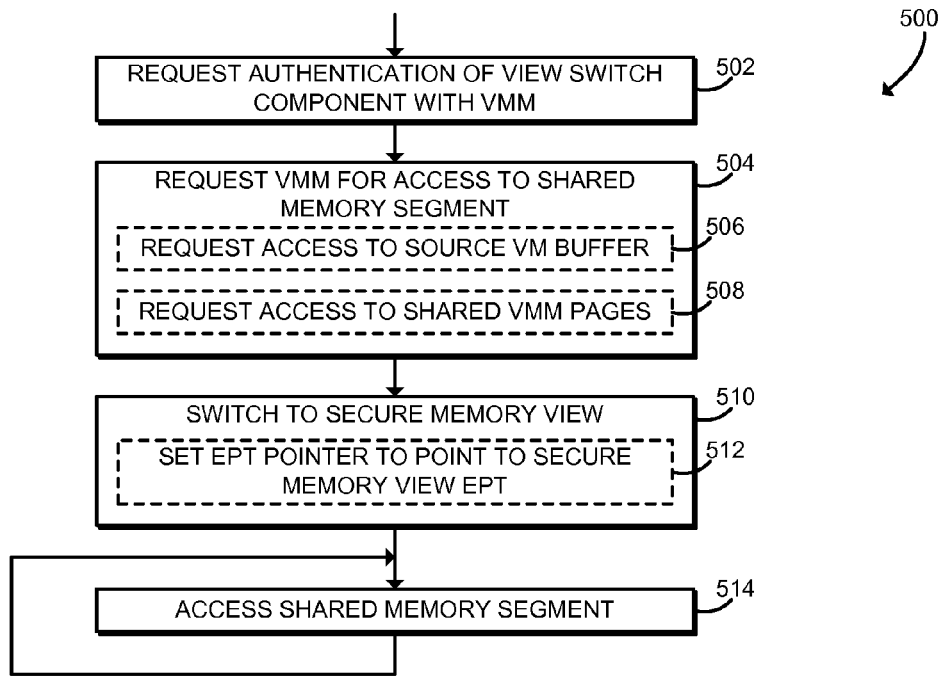
FIG. 5 is a simplified flow diagram of at least one embodiment of a method for accessing shared memory that may be executed by the computing device of FIGS. 1 and 2.

Referring now to FIG. 5, in use, the computing device 100 may execute a method 500 for accessing an inter-virtual-machine shared memory segment. The method 300 may be executed by the target virtual machine 204 and thus may execute in VMX-non-root mode with limited access to the computing device 100. The method 500 begins in block 502, in which the computing device 100 requests authentication of the view switch component 226 with the VMM 202. As described above in connection with blocks 302 through 304 of FIG. 3, the target virtual machine 204 requests authentication of the view switch component 226 prior to being granted access to the secure view 228. The target virtual machine 204 may request authentication by generating a VMExit, hypercall, or otherwise invoking the VMM 202. As described above, if the view switch component 226 is not verified, the computing device 100 may generate an error message or otherwise refuse to allow the unverified view switch component 226 to enable access to the secure view 228.

In block 504, the computing device 100 requests the VMM 202 for access to a shared memory segment. As described above in connection with block 316 of FIG. 3, the target virtual machine 204 may request access by generating a VMExit, a hypercall, or otherwise invoking the VMM 202. In some embodiments, in block 506 the target virtual machine 204 may request access to a buffer or other shared memory pages of the source virtual machine 206. In some embodiments, in block 508 the target virtual machine 204 may request access to the shared memory segment 214 established by the VMM 202.

In block 510, the computing device 100 switches to the secure view 228. After switching to the secure view 228, the shared memory segments may be accessible in the virtual address space of one or more guest applications 220 or operating systems executing in the target virtual machine 204. In some embodiments, in block 512, the computing device 100 may set the EPT pointer 136 to point to the EPT 134 associated with the secure view 228. For example, as shown in FIG. 4, the EPT pointer 136 may be switched from pointing to the default view EPT 134a to point to the secure view EPT 134b. The computing device 100 may switch the EPT pointer 136 using a specialized processor instruction such as the VMFUNC instruction. In some embodiments, switching the EPT pointer 136 may be limited to ring zero, kernel mode, or some other supervisory mode of the target virtual machine 204 and/or the processor 120. Therefore, the EPT pointer 136 may be switched by kernel-mode code such as an operating system driver. In some embodiments, user-mode code such as an application 220 may cause the EPT pointer 136 to be switched by calling a kernel-mode driver. In some embodiments, user-mode code such as an application 220 may be allowed to directly execute a specialized processor instruction such as the VMFUNC instruction.

In block 514, the computing device 100 accesses the shared memory segment. For example, applications 220 and/or operating systems of the target virtual machine 204 may read data from or write data to the shared memory segment. In some embodiments, the target virtual machine 204 may read or write network data or other I/O data to memory pages of the source virtual machine 206. In particular, the target virtual machine 204 may perform one or more direct memory access (DMA) operations on the memory pages of the source virtual machine 206, which may allow direct access to I/O devices and/or data. Additionally or alternatively, the target virtual machine 204 may read or write data to the shared memory segment 214 established by the VMM 202. Thus, the shared memory segment 214 may be used for inter-virtual-machine message passing, signaling, or other communication that does not involve accessing memory pages of the source virtual machine 206. After accessing the shared memory segment, the method 500 loops back to block 514 and may continue accessing the shared memory segment.

Figure 6:
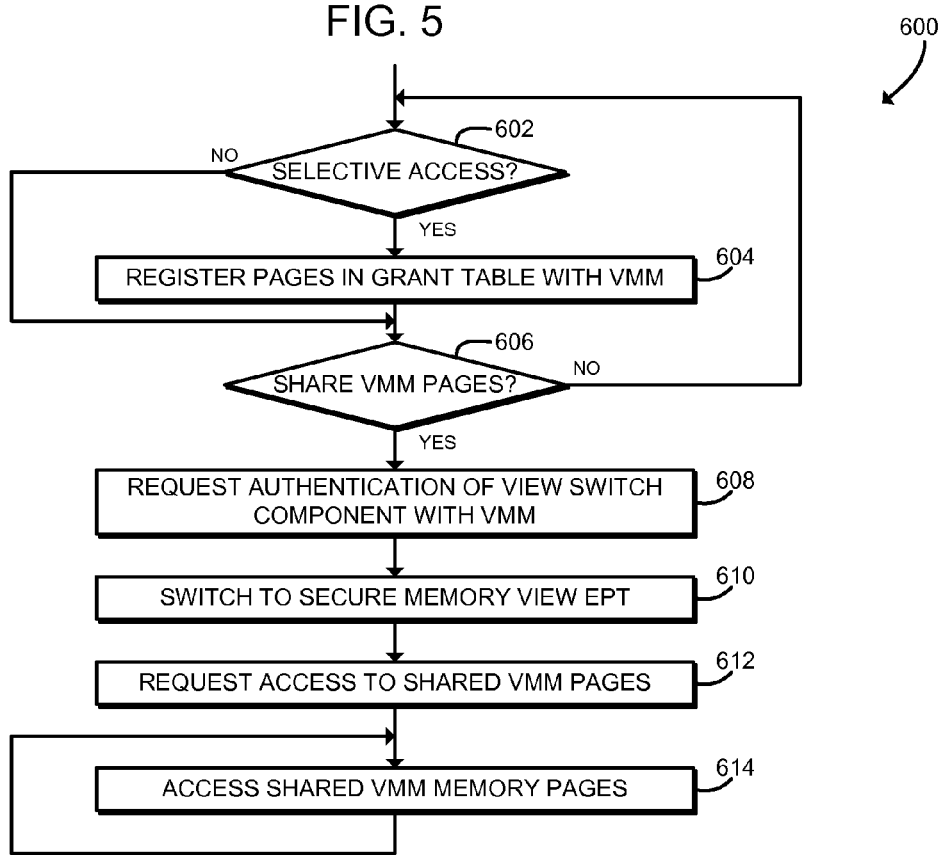
FIG. 6 is a simplified flow diagram of at least one embodiment of a method for granting access to shared memory that may be executed by the computing device of FIGS. 1 and 2.

Referring now to FIG. 6, in use, the computing device 100 may execute a method 600 for granting access to an inter-virtual-machine shared memory segment. The method 600 may be executed by the source virtual machine 206 and thus may execute in VMX-non-root mode with limited access to the computing device 100. The method 600 begins in block 602, in which the computing device 100 determines whether to selectively allow access to memory pages of the source virtual machine 206. If not, the method 600 branches ahead to block 606, described below. If selectively allowing access, the method 600 advances to block 604.

In block 604, the computing device 100 registers the shared memory segment with the source virtual machine 206. As described above in connection with block 308 of FIG. 3, the registration describes the guest-physical memory pages, segments, or other regions that are to be shared from the source virtual machine 206 to the target virtual machine 204. As described above, the computing device 100 may identify guest-physical pages to be shared in the grant table 232. The source virtual machine 206 may register the shared memory segment with the VMM 202 using any appropriate technique, including executing a VMExit or a hypercall, or otherwise invoking the VMM 202.

In block 606, the computing device 100 determines whether to access the shared memory segment 214 established by the VMM 202. If not, the method 600 loops back to block 602. Thus, when not providing selective access and not accessing the shared memory segment 214, the target virtual machine 204 may access memory of the source virtual machine 206 without any request to the VMM 202 or other affirmative action by the source virtual machine 206. If the computing device 100 determines to access the shared memory segment 214, the method 600 advances to block 608.

In block 608, the computing device 100 requests authentication of the view switch component 226 of the source virtual machine 206 with the VMM 202. As described above in connection with blocks 302 through 304 of FIG. 3, the source virtual machine 206 requests authentication of the view switch component 226 prior to being granted access to the secure view 228. The source virtual machine 206 may request authentication by generating a VMExit, hypercall, or otherwise invoking the VMM 202. As described above, if the view switch component 226 is not verified, the computing device 100 may generate an error message or otherwise refuse to allow the unverified view switch component 226 to enable access to the secure view 228.

In block 610, the computing device 100 switches to the secure view 228. After switching to the secure view 228, the shared memory segments may be accessible in the virtual address space of one or more guest applications 220 or operating systems executing in the source virtual machine 206. In some embodiments the computing device 100 may set the EPT pointer 136 to point to the EPT 134 associated with the secure view 228. For example, as shown in FIG. 4, the EPT pointer 136 may be switched from pointing to the default view EPT 134a to point to the secure view EPT 134b. The computing device 100 may switch the EPT pointer 136 using a specialized processor instruction such as the VMFUNC instruction. In some embodiments, switching the EPT pointer 136 may be limited to ring zero, kernel mode, or some other supervisory mode of the source virtual machine 206 and/or the processor 120. Therefore, the EPT pointer 136 may be switched by kernel-mode code such as an operating system driver. In some embodiments, user-mode code such as an application 220 may cause the EPT pointer 136 to be switched by calling a kernel-mode driver. In some embodiments, user-mode code such as an application 220 may be allowed to directly execute a specialized processor instruction such as the VMFUNC instruction.

In block 612, the computing device 100 requests the VMM 202 for access to the shared memory segment 214. As described above in connection with block 316 of FIG. 3, the source virtual machine 206 may request access by generating a VMExit, a hypercall, or otherwise invoking the VMM 202. The computing device 100 may request access to the shared memory segment 214 by identifying pages within the secure view 228 in the grant table 232.

In block 614, the computing device 100 accesses the shared memory segment 214 of established by the VMM 202. The source virtual machine 206 may read or write data stored within the shared memory segment 214. For example, the source virtual machine 206 may use the shared memory segment 214 to transfer or otherwise manage ownership of memory pages with the target virtual machine 204, as described further below in relation to FIGS. 7-9. The method 600 loops back to block 614 to continue accessing the shared memory segment 214.

Figure 7:
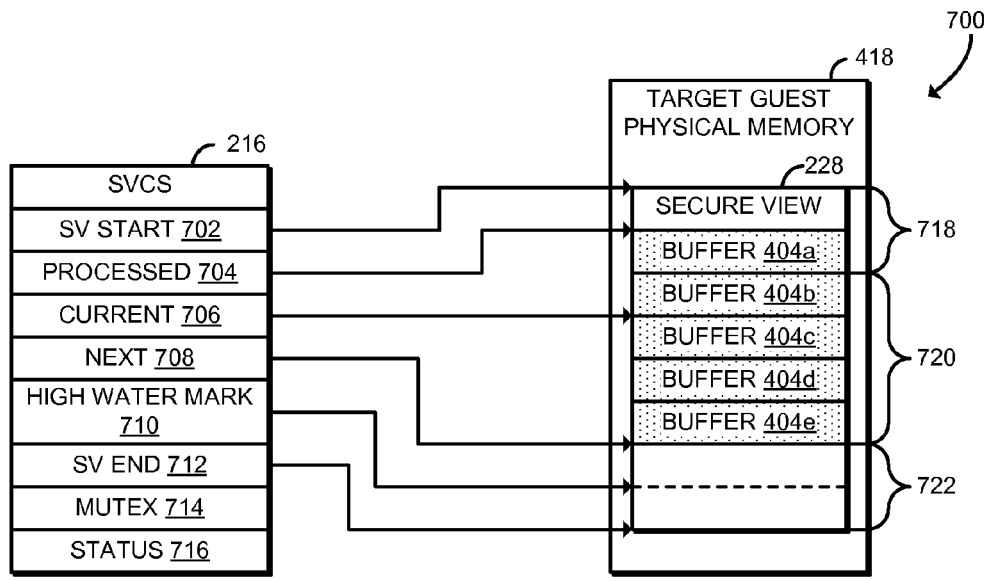
FIG. 7 is a schematic diagram illustrating a secure view control structure that may be established by the computing device of FIGS. 1 and 2.

Referring now to FIG. 7, the diagram 700 illustrates one potential embodiment of a secure view control structure (SVCS) 216 used to transfer ownership of memory buffers between the source virtual machine 206 and the target virtual machine 204. As shown, the SVCS 216 is associated with an illustrative secure view 228 that includes several buffers 404a through 404e. Those buffers 404 may be shared memory segments produced by the source virtual machine 206. For example, each buffer 404 may include a receive queue, a transmit queue, or any other I/O buffer of the source virtual machine 206.

As shown, the SVCS 216 includes a number of pointers to locations within the secure view 228 in the guest-physical memory 418 of the target virtual machine 204. In the illustrative embodiment, the pointers are stored as guest page frame numbers. Of course, in other embodiments, those pointers may be stored in other formats or based on different address spaces. For example, the SVCS 216 may include pointers within the virtual memory 414 of the target virtual machine 204 and/or offsets relative to the secure view 228.

In particular, the illustrative SVCS 216 includes a secure view start pointer 702 and a secure view end pointer 712 that reference the start and end of the secure view 228, respectively. The SVCS 216 also includes a processed pointer 704, a current pointer 706, a next pointer 708, and a high water mark pointer 710. Those pointers are used to coordinate ownership of memory buffers between the source virtual machine 206 and the target virtual machine 204, as described further below in connection with FIGS. 8 and 9. In the illustrative embodiment, the SVCS 216 also includes a mutex 714 and a set of status flags 716. The mutex 714 and the status flags 716 may be used for coordinating concurrent access to the SVCS 216 between the source virtual machine 206 and the target virtual machine 204.

As shown, the SVCS 216 divides the secure view 228 into a number of regions 718, 720, 722. The used region 718 is defined from the secure view start pointer 702 to the processed pointer 704, inclusive, and includes the buffer 404a in the illustrative embodiment. The used region 718 represents buffers 404 that have already been processed by the target virtual machine 204 and thus may be reclaimed by the source virtual machine 206. The in-use region 720 is defined from processed pointer 704 to the next pointer 708, non-inclusive, and thus includes the buffers 404b through 404e. The in-use region 720 represents buffers 404 that have newly been shared by the source virtual machine 206. The buffers between the processed pointer 704 and the current pointer 706, non-inclusive, (e.g., the buffer 404b) represents the buffers 404 that are actively being processed by the target virtual machine 204. The unused region 722, from the next pointer 708, inclusive, to the secure view end pointer 712, not inclusive, represents free space in the secure view 228 that may be populated by additional buffers 404 shared from the source virtual machine 206. The high water mark pointer 710 refers to a threshold address in the secure view 228. When the secure view 228 is filled at or beyond the high water mark pointer 710, buffers 404 in the used region 718 may be reclaimed.

Figure 8:
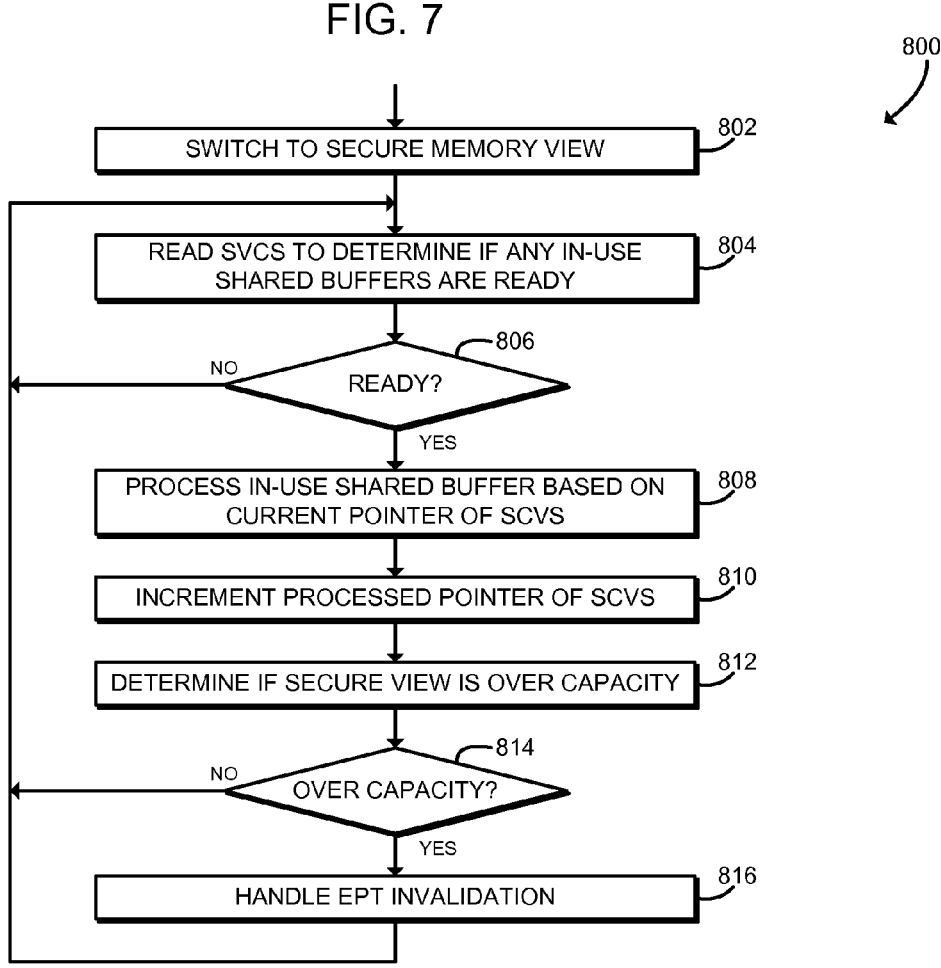
FIG. 8 is a simplified flow diagram of at least one embodiment of a method for taking ownership of a shared memory buffer that may be executed by the computing device of FIGS. 1 and 2.

Referring now to FIG. 8, in use, the computing device 100 may execute a method 800 for taking ownership of a shared memory buffer. The method 800 may be executed by the target virtual machine 204 and thus may execute in VMX-non-root mode with limited access to the computing device 100. The method 800 begins in block 802, in which the computing device 100 switches to the secure view 228. The computing device 100 may authenticate the secure view switch component 226 and then switch to the secure view 228 by updating the EPT pointer 136, as described above in connection with FIG. 5. In particular, the computing device 100 may request access to the shared memory segment 214 established by the VMM 202. The shared memory segment 214 includes a secure view control structure (SVCS) 216.

Referring back to FIG. 4, the diagram 400 illustrates access by the target virtual machine 204 to the SVCS 216. As shown, the SVCS 216 is located at a virtual page 430 within the secure view 228. The guest page table 132b maps the virtual page 430 to a guest-physical page 432. The default view EPT 134a maps the guest-physical page 432 to a physical page 434. The physical page 434 does not provide access to the SVCS 216; for example, the physical page 434 may be zeroed, or permissions may be set to restrict access to the physical page 434. In contrast, the secure view EPT 134*b* maps the guest-physical page 432 to a physical page 436 that contains the SVCS 216. The physical page 436 may be allocated, established, or otherwise maintained by the VMM 202. For example, the physical page 436 may be allocated in the heap of the VMM 202. Thus, applications 220 and/or operating systems executing in the target virtual machine 204 may access the SVCS 216 via the secure view 228.

Referring back to FIG. 8, in block 804 the computing device 100 reads the SVCS 216 to determine if any in-use shared buffers are ready to be processed. The computing device 100 may determine whether any in-use shared buffers are ready to be processed by examining the processed pointer 704, the current pointer 706, and/or the next pointer 708 of the SVCS 216. For example, the computing device 100 may determine whether the processed pointer 704 is less than the next pointer 708, indicating that additional buffers 404 have been shared by the source virtual machine 206. In block 806, the computing device 100 determines whether shared buffers are ready. If not, the method 800 loops back to block 804 to continue monitoring the SVCS 216. If shared buffers are ready, the method 800 advances to block 808.

In block 808, the computing device 100 processes one or more shared buffers in the in-use region 720, based on the current pointer 706 of the SVCS 216. The target virtual machine 204 may perform any operation to process the shared buffers. For example, the target virtual machine 204 may perform one or more virtual network functions such as packet routing, packet filtering, or otherwise processing network packet data. In block 810, after processing the shared buffer, the computing device 100 increments the processed pointer 704 of the SVCS 216. As described above, incrementing the processed pointer 704 indicates that those shared buffers have been processed by the target virtual machine 204 and may be reclaimed by the source virtual machine 206.

In block 812, the computing device 100 determines whether the secure view 228 is over a predefined capacity level. The computing device 100 may make that determination, for example, by determining whether the next pointer 708 of the SVCS 216 equals or exceeds the high water mark pointer 710 of the SVCS 216. In some embodiments, the computing device 100 may compare the processed pointer 704 to the high water mark pointer 710, to determine whether all of the shared buffers have been processed. In block 814, the computing device 100 branches based on whether the secure view 228 is over capacity. If not over capacity (i.e., if the next pointer 708 and/or the processed pointer 704 does not exceed the high water mark pointer 710), the method 800 loops back to block 804 to continue processing shared buffers. If the secure view 228 is over capacity, the method 800 advances to block 816.

In block 816, the computing device 100 may handle an EPT 134 invalidation generated by the VMM 202. As further described below, the source virtual machine 206 may reclaim used shared buffers when the secure view 228 is over capacity. After that memory is reclaimed, the VMM 202 may reset the secure view 228, for example by invalidating the current EPT 134 associated with the secure view 228 and re-initializing any associated SVCS 216. Invalidating the EPT 134 may remove translation entries cached by the processor 120 relating to used buffers. After the secure view 228 is cleared, the target virtual machine 204 may be required to re-initialize the secure view 228, for example by switching to a new EPT 134. After handling any EPT invalidation, the method 800 loops back to block 804 to continue processing shared buffers.

Figure 9:
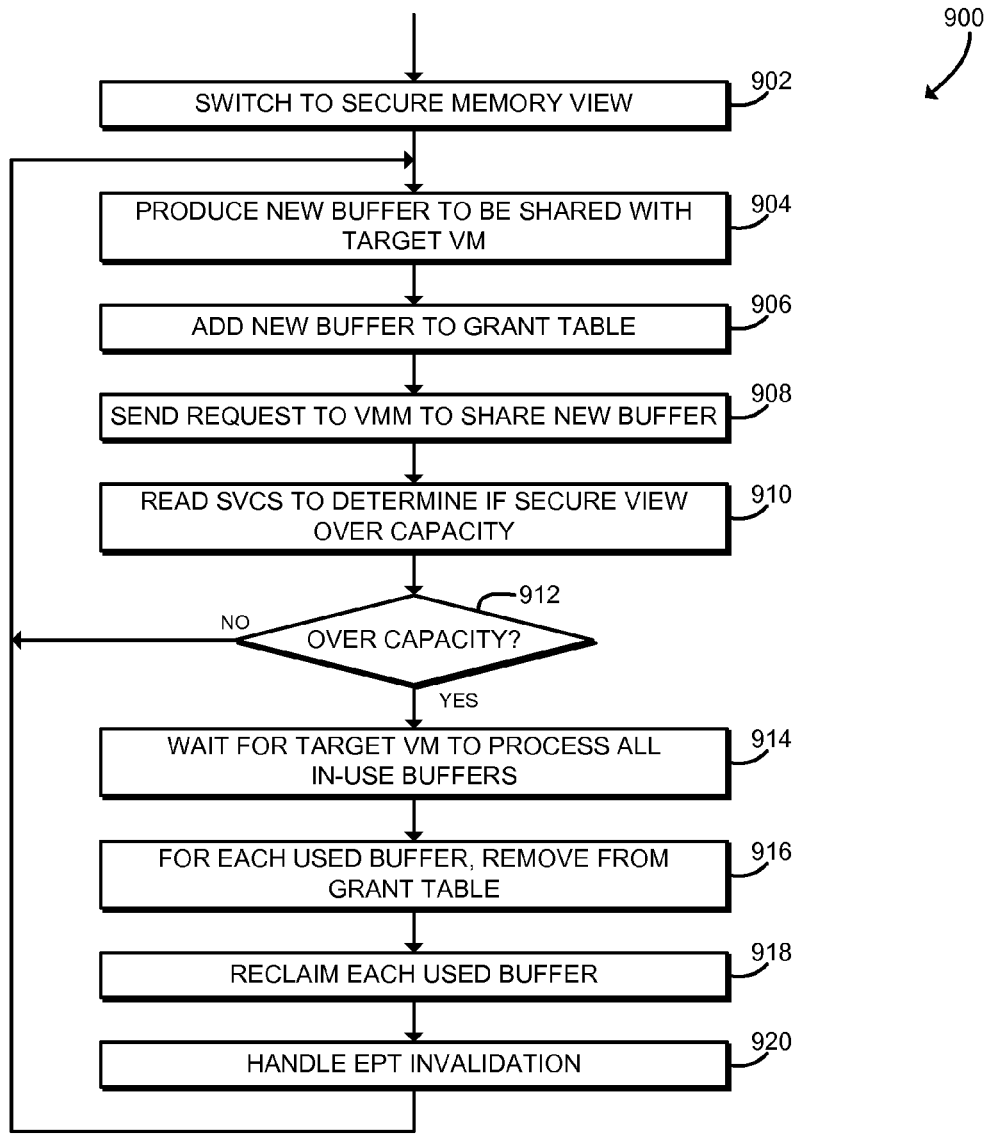
FIG. 9 is a simplified flow diagram of at least one embodiment of a method for transferring and reclaiming ownership of a shared memory buffer that may be executed by the computing device of FIGS. 1 and 2.

Referring now to FIG. 9, in use, the computing device 100 may execute a method 900 for transferring ownership of a shared memory buffer. The method 900 may be executed by the source virtual machine 206 and thus may execute in VMX-non-root mode with limited access to the computing device 100. The method 900 begins in block 902, in which the computing device 100 switches to the secure view 228. The computing device 100 may authenticate the secure view switch component 226 and then switch to the secure view 228 by updating the EPT pointer 136, as described above in connection with FIG. 6. In particular, the computing device 100 may request access to the shared memory segment 214 established by the VMM 202. As described above, the shared memory segment 214 includes the SVCS 216.

In block 904, the computing device 100 produces a new shared buffer to be shared with the target virtual machine 204. The shared buffer may be embodied as, for example, one or more guest-physical pages of the source virtual machine 206. In some embodiments, the shared buffer may include a receive queue, a transmit queue, or any other network I/O data generated by the source virtual machine 206 that is to be processed by the target virtual machine 204.

In block 906, the computing device 100 adds the newly-created shared buffer to the grant table 232. As described above, adding the buffer to the grant table 232 indicates that the buffer should be shared with the target virtual machine 204. In block 908, the computing device 100 sends a request to the VMM 202 to share the new buffer with the target virtual machine 204. As described above in FIG. 6, the source virtual machine 206 may register the newly created shared buffer with the VMM 202 using any appropriate technique, including executing a VMExit or a hypercall, or otherwise invoking the VMM 202. The VMM 202 may map the newly created shared buffer within the secure view 228 at the location of the next pointer 708 of the SVCS 216. After successfully sharing that buffer, the next pointer 708 may be incremented.

In block 910, the computing device 100 reads the SVCS 216 to determine whether the secure view 228 is over capacity. For example, the computing device 100 may determine whether the next pointer 708 equals or exceeds the high water mark pointer 710. In block 912, the computing device 100 branches based on whether the secure view 228 is over capacity. If not, the method 900 branches loops back to block 904 to continue producing shared memory buffers. If the secure view 228 is over capacity, the method 900 advances to block 914.

In block 914, the computing device 100 waits for the target virtual machine 204 to process all in-use shared memory buffers 404. The source virtual machine 206 may set one or more flags in the status flags 716 of the SVCS 216 to indicate that the source virtual machine 206 is waiting for completion. As described above, the target virtual machine 204 may continue to process in-use buffers 404 until no buffers 404 remain in the in-use region 720. The source virtual machine 206 may monitor the SVCS 216 to determine when the target virtual machine 204 has completed processing the in-use buffers 404. Additionally or alternatively, rather than waiting for the target virtual machine 204, in some embodiments the source virtual machine 206 may submit the newly created buffer to another secure view 228 maintained by a different thread of the target virtual machine 204.

After all in-use buffers 404 are processed, in block 916 the computing device 100 removes each used buffer 404 from the grant table 232. As described above, by removing those buffers 404 from the grant table 232, the source virtual machine 206 indicates that those buffers should no longer be shared with the target virtual machine 204. In block 918, the computing device 100 reclaims each used buffer 404. For example, the source virtual machine 206 may free, delete, or otherwise deallocate memory associated with each buffer 404 within the used region 718. After reclamation, the memory associated with the used buffers 404 may be re-used by the source virtual machine 206. In block 920, the computing device 100 may handle an EPT invalidation generated by the VMM 202. After the memory associated with the used buffers 404 has been reclaimed, the VMM 202 may reset the secure view 228, for example by invalidating the current EPT 134 associated with the secure view 228 and re-initializing any associated SVCS 216. Invalidating the EPT 134 may remove translation entries cached by the processor 120 that refer to used buffers and thus may allow for re-use of memory. After the secure view 228 is cleared, the source virtual machine 206 may be required to re-initialize the secure view 228, for example by switching to a new EPT 134. By only reclaiming memory when the secure view 228 is over capacity, the computing device 100 may reduce the number of EPT invalidations as compared to, for example, reclaiming each buffer as it is processed. After performing any EPT invalidation, the method 900 loops back to block 904 to continue producing shared buffers.

EXAMPLES

Illustrative examples of the technologies disclosed herein are provided below. An embodiment of the technologies may include any one or more, and any combination of, the examples described below.

Example 1 includes a computing device for secure inter-virtual-machine shared memory communication, the computing device comprising an authentication module to authenticate, by a virtual machine monitor of the computing device, a view switch component of a target virtual machine of the computing device in response to a request to authenticate the view switch component received from the target virtual machine; a secure view module to configure, by the virtual machine monitor in response to authentication of the view switch component, a secure memory view to access a shared memory segment of the computing device in response to a request to access the shared memory segment received from the target virtual machine, wherein the secure memory view defines a physical memory map of the computing device; a view switch module to switch, by the target virtual machine using the view switch component, to the secure memory view without a virtual machine exit event in response to the request to access the shared memory segment; and a data access module to access, by the target virtual machine, the shared memory segment in response to switching to the secure memory view.

Example 2 includes the subject matter of Example 1, and wherein the view switch component comprises an operating system kernel, a kernel-mode driver, or a user-level application.

Example 3 includes the subject matter of any of Examples 1 and 2, and wherein the shared memory segment comprises one or more physical memory pages of the computing device.

Example 4 includes the subject matter of any of Examples 1-3, and wherein to configure the secure memory view comprises to configure an extended page table of the computing device.

Example 5 includes the subject matter of any of Examples 1-4, and wherein to switch to the secure memory view comprises to set an extended page table pointer of the computing device to reference the extended page table.

Example 6 includes the subject matter of any of Examples 1-5, and wherein to set the extended page table pointer comprises to execute a processor instruction to change the extended page table pointer.

Example 7 includes the subject matter of any of Examples 1-6, and wherein the shared memory segment comprises guest physical memory pages of a source virtual machine of the computing device.

Example 8 includes the subject matter of any of Examples 1-7, and wherein the shared memory segment comprises an input/output buffer.

Example 9 includes the subject matter of any of Examples 1-8, and wherein the shared memory segment comprises a transmit queue or a receive queue.

Example 10 includes the subject matter of any of Examples 1-9, and further including an access control module to register, by the source virtual machine, the shared memory segment with the virtual machine monitor; wherein to configure the secure memory view to access the shared memory segment comprises to configure the secure memory view to access the shared memory segment registered by the source virtual machine.

Example 11 includes the subject matter of any of Examples 1-10, and wherein to register the shared memory segment comprises to identify guest physical pages of the shared memory segment in a grant table of the source virtual machine; and submit the grant table to the virtual machine monitor.

Example 12 includes the subject matter of any of Examples 1-11, and further including a shared memory module to establish, by the virtual machine monitor, the shared memory segment; wherein the authentication module is further to authenticate, by the virtual machine monitor, a view switch component of a source virtual machine of the computing device in response to a request to authenticate the view switch component received from the source virtual machine; the view switch module is further to switch, by the source virtual machine using the view switch component of the source virtual machine, to the secure memory view without a virtual machine exit event in response to authentication of the view switch component; and the data access module is further to access, by the source virtual machine, the shared memory segment in response to switching to the secure memory view; wherein to configure the secure memory view to access the shared memory segment comprises to configure the secure memory view to access the shared memory segment established by the virtual machine monitor.

Example 13 includes the subject matter of any of Examples 1-12, and further including an access control module to register, by the source virtual machine, a second shared memory segment with the virtual machine monitor; wherein to configure the secure memory view to access the shared memory segment further comprises to configure the secure memory view to access the second shared memory segment registered by the source virtual machine; and to access, by the target virtual machine, the shared memory segment further comprises to access, by the target virtual machine, the second shared memory segment.

Example 14 includes the subject matter of any of Examples 1-13, and further including a buffer ownership module to generate, by the source virtual machine, a shared buffer to be processed by the target computing device, wherein the second shared memory segment includes the shared buffer; process, by the target virtual machine, the shared buffer in response to an access of the shared memory segment; and coordinate, by the target virtual machine and the source virtual machine, ownership of the shared buffer using a secure view control structure stored in the shared memory segment established by the virtual machine monitor.

Example 15 includes the subject matter of any of Examples 1-14, and wherein to register the second shared memory segment comprises to register the shared buffer at a next pointer of the secure view control structure; to process the shared buffer comprises to increment a processed pointer of the secure view control structure in response to processing of the shared buffer; and to generate the shared buffer comprises to determine, by the source virtual machine, whether a capacity of the secure view is exceeded, and in response to a determination that the capacity of the source virtual machine is exceeded, to wait, by the source virtual machine, for the target virtual machine to complete processing the shared buffer; remove, by the source virtual machine, the shared buffer from the grant table in response to completion of processing of the shared buffer by the target virtual machine; reclaim, by the source virtual machine, the shared buffer in response to removal of the shared buffer from the grant table; and invalidate, by the virtual machine monitor, an extended page table of the computing device in response to reclamation of the shared buffer.

Example 16 includes the subject matter of any of Examples 1-15, and wherein to determine whether the capacity of the secure view is exceeded comprises to determine whether the next pointer of the secure view control structure exceeds a reference pointer of the secure view control structure.

Example 17 includes a method for secure inter-virtual-machine shared memory communication, the method comprising authenticating, by a virtual machine monitor of a computing device, a view switch component of a target virtual machine of the computing device in response to a request to authenticate the view switch component received from the target virtual machine; configuring, by the virtual machine monitor in response to authenticating the view switch component, a secure memory view to access a shared memory segment of the computing device in response to a request to access the shared memory segment received from the target virtual machine, wherein the secure memory view defines a physical memory map of the computing device; switching, by the target virtual machine using the view switch component, to the secure memory view without a virtual machine exit event in response to the request to access the shared memory segment; and accessing, by the target virtual machine, the shared memory segment in response to switching to the secure memory view.

Example 18 includes the subject matter of Example 17, and wherein the view switch component comprises an operating system kernel, a kernel-mode driver, or a user-level application.

Example 19 includes the subject matter of any of Examples 17 and 18, and wherein the shared memory segment comprises one or more physical memory pages of the computing device.

Example 20 includes the subject matter of any of Examples 17-19, and wherein configuring the secure memory view comprises configuring an extended page table of the computing device.

Example 21 includes the subject matter of any of Examples 17-20, and wherein switching to the secure memory view comprises setting an extended page table pointer of the computing device to reference the extended page table.

Example 22 includes the subject matter of any of Examples 17-21, and wherein setting the extended page table pointer comprises executing a processor instruction to change the extended page table pointer.

Example 23 includes the subject matter of any of Examples 17-22, and wherein the shared memory segment comprises guest physical memory pages of a source virtual machine of the computing device.

Example 24 includes the subject matter of any of Examples 17-23, and wherein the shared memory segment comprises an input/output buffer.

Example 25 includes the subject matter of any of Examples 17-24, and wherein the shared memory segment comprises a transmit queue or a receive queue.

Example 26 includes the subject matter of any of Examples 17-25, and further including registering, by the source virtual machine, the shared memory segment with the virtual machine monitor; wherein configuring the secure memory view to access the shared memory segment comprises configuring the secure memory view to access the shared memory segment registered by the source virtual machine.

Example 27 includes the subject matter of any of Examples 17-26, and wherein registering the shared memory segment comprises identifying guest physical pages of the shared memory segment in a grant table of the source virtual machine; and submitting the grant table to the virtual machine monitor.

Example 28 includes the subject matter of any of Examples 17-27, and further including establishing, by the virtual machine monitor, the shared memory segment; authenticating, by the virtual machine monitor, a view switch component of a source virtual machine of the computing device in response to a request to authenticate the view switch component received from the source virtual machine; switching, by the source virtual machine using the view switch component, to the secure memory view without a virtual machine exit event in response to authenticating the view switch component; and accessing, by the source virtual machine, the shared memory segment in response to switching to the secure memory view; wherein configuring the secure memory view to access the shared memory segment comprises configuring the secure memory view to access the shared memory segment established by the virtual machine monitor.

Example 29 includes the subject matter of any of Examples 17-28, and further including registering, by the source virtual machine, a second shared memory segment with the virtual machine monitor; wherein configuring the secure memory view to access the shared memory segment further comprises configuring the secure memory view to access the second shared memory segment registered by the source virtual machine; and accessing, by the target virtual machine, the shared memory segment further comprises accessing, by the target virtual machine, the second shared memory segment.

Example 30 includes the subject matter of any of Examples 17-29, and further including generating, by the source virtual machine, a shared buffer to be processed by the target computing device, wherein the second shared memory segment includes the shared buffer; processing, by the target virtual machine, the shared buffer in response to accessing the shared memory segment; and coordinating, by the target virtual machine and the source virtual machine, ownership of the shared buffer using a secure view control structure stored in the shared memory segment established by the virtual machine monitor.

Example 31 includes the subject matter of any of Examples 17-30, and wherein registering, by the source virtual machine, the second shared memory segment comprises registering the shared buffer at a next pointer of the secure view control structure; processing the shared buffer comprises incrementing a processed pointer of the secure view control structure in response to processing the shared buffer; and generating the shared buffer comprises determining, by the source virtual machine, whether a capacity of the secure view is exceeded, and in response to determining that the capacity of the source virtual machine is exceeded waiting, by the source virtual machine, for the target virtual machine to complete processing the shared buffer; removing, by the source virtual machine, the shared buffer from the grant table in response to the target virtual machine completing processing of the shared buffer; reclaiming, by the source virtual machine, the shared buffer in response to removing the shared buffer from the grant table; and invalidating, by the virtual machine monitor, an extended page table of the computing device in response to reclaiming the shared buffer.

Example 32 includes the subject matter of any of Examples 17-31, and wherein determining whether the capacity of the secure view is exceeded comprises determining whether the next pointer of the secure view control structure exceeds a reference pointer of the secure view control structure.

Example 33 includes a computing device comprising a processor; and a memory having stored therein a plurality of instructions that when executed by the processor cause the computing device to perform the method of any of Examples 17-32.

Example 34 includes one or more machine readable storage media comprising a plurality of instructions stored thereon that in response to being executed result in a computing device performing the method of any of Examples 17-32.

Example 35 includes a computing device comprising means for performing the method of any of Examples 17-32.

Example 36 includes a computing device for secure inter-virtual-machine shared memory communication, the computing device comprising means for authenticating, by a virtual machine monitor, a view switch component of a target virtual machine of the computing device in response to a request to authenticate the view switch component received from the target virtual machine; means for configuring, by the virtual machine monitor in response to authenticating the view switch component, a secure memory view to access a shared memory segment of the computing device in response to a request to access the shared memory segment received from the target virtual machine, wherein the secure memory view defines a physical memory map of the computing device; means for switching, by the target virtual machine using the view switch component, to the secure memory view without a virtual machine exit event in response to the request to access the shared memory segment; and means for accessing, by the target virtual machine, the shared memory segment in response to switching to the secure memory view.

Example 37 includes the subject matter of Example 36, and wherein the view switch component comprises an operating system kernel, a kernel-mode driver, or a user-level application.

Example 38 includes the subject matter of any of Examples 36 and 37, and wherein the shared memory segment comprises one or more physical memory pages of the computing device.

Example 39 includes the subject matter of any of Examples 36-38, and wherein the means for configuring the secure memory view comprises means for configuring an extended page table of the computing device.

Example 40 includes the subject matter of any of Examples 36-39, and wherein the means for switching to the secure memory view comprises means for setting an extended page table pointer of the computing device to reference the extended page table.

Example 41 includes the subject matter of any of Examples 36-40, and wherein the means for setting the extended page table pointer comprises means for executing a processor instruction to change the extended page table pointer.

Example 42 includes the subject matter of any of Examples 36-41, and wherein the shared memory segment comprises guest physical memory pages of a source virtual machine of the computing device.

Example 43 includes the subject matter of any of Examples 36-42, and wherein the shared memory segment comprises an input/output buffer.

Example 44 includes the subject matter of any of Examples 36-43, and wherein the shared memory segment comprises a transmit queue or a receive queue.

Example 45 includes the subject matter of any of Examples 36-44, and further including means for registering, by the source virtual machine, the shared memory segment with the virtual machine monitor; wherein the means for configuring the secure memory view to access the shared memory segment comprises means for configuring the secure memory view to access the shared memory segment registered by the source virtual machine.

Example 46 includes the subject matter of any of Examples 36-45, and wherein the means for registering the shared memory segment comprises means for identifying guest physical pages of the shared memory segment in a grant table of the source virtual machine; and means for submitting the grant table to the virtual machine monitor.

Example 47 includes the subject matter of any of Examples 36-46, and further including means for establishing, by the virtual machine monitor, the shared memory segment; means for authenticating, by the virtual machine monitor, a view switch component of a source virtual machine of the computing device in response to a request to authenticate the view switch component received from the source virtual machine; means for switching, by the source virtual machine using the view switch component, to the secure memory view without a virtual machine exit event in response to authenticating the view switch component; and means for accessing, by the source virtual machine, the shared memory segment in response to switching to the secure memory view; wherein the means for configuring the secure memory view to access the shared memory segment comprises means for configuring the secure memory view to access the shared memory segment established by the virtual machine monitor.

Example 48 includes the subject matter of any of Examples 36-47, and further including means for registering, by the source virtual machine, a second shared memory segment with the virtual machine monitor; wherein the means for configuring the secure memory view to access the shared memory segment further comprises means for configuring the secure memory view to access the second shared memory segment registered by the source virtual machine; and the means for accessing, by the target virtual machine, the shared memory segment further comprises means for accessing, by the target virtual machine, the second shared memory segment.

Example 49 includes the subject matter of any of Examples 36-48, and further including means for generating, by the source virtual machine, a shared buffer to be processed by the target computing device, wherein the second shared memory segment includes the shared buffer; means for processing, by the target virtual machine, the shared buffer in response to accessing the shared memory segment; and means for coordinating, by the target virtual machine and the source virtual machine, ownership of the shared buffer using a secure view control structure stored in the shared memory segment established by the virtual machine monitor.

Example 50 includes the subject matter of any of Examples 36-49, and wherein the means for registering, by the source virtual machine, the second shared memory segment comprises means for registering the shared buffer at a next pointer of the secure view control structure; the means for processing the shared buffer comprises means for incrementing a processed pointer of the secure view control structure in response to processing the shared buffer; and the means for generating the shared buffer comprises means for determining, by the source virtual machine, whether a capacity of the secure view is exceeded, and in response to determining that the capacity of the source virtual machine is exceeded means for waiting, by the source virtual machine, for the target virtual machine to complete processing the shared buffer; means for removing, by the source virtual machine, the shared buffer from the grant table in response to the target virtual machine completing processing of the shared buffer; means for reclaiming, by the source virtual machine, the shared buffer in response to removing the shared buffer from the grant table; and means for invalidating, by the virtual machine monitor, an extended page table of the computing device in response to reclaiming the shared buffer.

Example 51 includes the subject matter of any of Examples 36-50, and wherein the means for determining whether the capacity of the secure view is exceeded comprises means for determining whether the next pointer of the secure view control structure exceeds a reference pointer of the secure view control structure.

The invention claimed is:

1. A computing device for secure inter-virtual-machine shared memory communication, the computing device comprising:
an authentication module to authenticate, by a virtual machine monitor of the computing device, a view switch component of a target virtual machine of the computing device in response to a request to authenticate the view switch component received from the target virtual machine;
a secure view module to configure, by the virtual machine monitor in response to authentication of the view switch component, a secure memory view to access a shared memory segment of the computing device in response to a request to access the shared memory segment received from the target virtual machine, wherein the secure memory view defines a physical memory map of the computing device;
a view switch module to switch, by the target virtual machine using the view switch component, to the secure memory view without a virtual machine exit event in response to the request to access the shared memory segment; and
a data access module to access, by the target virtual machine, the shared memory segment in response to switching to the secure memory view.

2. The computing device of claim 1, wherein:
the shared memory segment comprises one or more physical memory pages of the computing device; and
to configure the secure memory view comprises to configure an extended page table of the computing device.

3. The computing device of claim 2, wherein to switch to the secure memory view comprises to set an extended page table pointer of the computing device to reference the extended page table.

4. The computing device of claim 3, wherein to set the extended page table pointer comprises to execute a processor instruction to change the extended page table pointer.

5. The computing device of claim 1, wherein the shared memory segment comprises guest physical memory pages of a source virtual machine of the computing device.

6. The computing device of claim 5, further comprising:
an access control module to register, by the source virtual machine, the shared memory segment with the virtual machine monitor;
wherein to configure the secure memory view to access the shared memory segment comprises to configure the secure memory view to access the shared memory segment registered by the source virtual machine.

7. The computing device of claim 1, further comprising:
a shared memory module to establish, by the virtual machine monitor, the shared memory segment;
wherein:
the authentication module is further to authenticate, by the virtual machine monitor, a view switch component of a source virtual machine of the computing device in response to a request to authenticate the view switch component received from the source virtual machine;
the view switch module is further to switch, by the source virtual machine using the view switch component of the source virtual machine, to the secure memory view without a virtual machine exit event in response to authentication of the view switch component; and
the data access module is further to access, by the source virtual machine, the shared memory segment in response to switching to the secure memory view;
wherein to configure the secure memory view to access the shared memory segment comprises to configure the secure memory view to access the shared memory segment established by the virtual machine monitor.

8. The computing device of claim 7, further comprising:
an access control module to register, by the source virtual machine, a second shared memory segment with the virtual machine monitor; wherein:
to configure the secure memory view to access the shared memory segment further comprises to configure the secure memory view to access the second shared memory segment registered by the source virtual machine; and to access, by the target virtual machine, the shared memory segment further comprises to access, by the target virtual machine, the second shared memory segment.

9. The computing device of claim 8, further comprising a buffer ownership module to:
generate, by the source virtual machine, a shared buffer to be processed by the target computing device, wherein the second shared memory segment includes the shared buffer;
process, by the target virtual machine, the shared buffer in response to an access of the shared memory segment; and
coordinate, by the target virtual machine and the source virtual machine, ownership of the shared buffer using a secure view control structure stored in the shared memory segment established by the virtual machine monitor.

10. The computing device of claim 9, wherein:
to register the second shared memory segment comprises to register the shared buffer at a next pointer of the secure view control structure;
to process the shared buffer comprises to increment a processed pointer of the secure view control structure in response to processing of the shared buffer; and
to generate the shared buffer comprises to determine, by the source virtual machine, whether a capacity of the secure view is exceeded, and in response to a determination that the capacity of the source virtual machine is exceeded, to:
wait, by the source virtual machine, for the target virtual machine to complete processing the shared buffer;
remove, by the source virtual machine, the shared buffer from the grant table in response to completion of processing of the shared buffer by the target virtual machine;
reclaim, by the source virtual machine, the shared buffer in response to removal of the shared buffer from the grant table; and
invalidate, by the virtual machine monitor, an extended page table of the computing device in response to reclamation of the shared buffer.

11. The computing device of claim 10, wherein to determine whether the capacity of the secure view is exceeded comprises to determine whether the next pointer of the secure view control structure exceeds a reference pointer of the secure view control structure.

12. A method for secure inter-virtual-machine shared memory communication, the method comprising:
authenticating, by a virtual machine monitor of a computing device, a view switch component of a target virtual machine of the computing device in response to a request to authenticate the view switch component received from the target virtual machine;
configuring, by the virtual machine monitor in response to authenticating the view switch component, a secure memory view to access a shared memory segment of the computing device in response to a request to access the shared memory segment received from the target virtual machine, wherein the secure memory view defines a physical memory map of the computing device;
switching, by the target virtual machine using the view switch component, to the secure memory view without a virtual machine exit event in response to the request to access the shared memory segment; and
accessing, by the target virtual machine, the shared memory segment in response to switching to the secure memory view.

13. The method of claim 12, wherein:
the shared memory segment comprises one or more physical memory pages of the computing device; and
configuring the secure memory view comprises configuring an extended page table of the computing device.

14. The method of claim 12, wherein the shared memory segment comprises guest physical memory pages of a source virtual machine of the computing device, the method further comprising:
registering, by the source virtual machine, the shared memory segment with the virtual machine monitor;
wherein configuring the secure memory view to access the shared memory segment comprises configuring the secure memory view to access the shared memory segment registered by the source virtual machine.

15. The method of claim 12, further comprising:
establishing, by the virtual machine monitor, the shared memory segment;
authenticating, by the virtual machine monitor, a view switch component of a source virtual machine of the computing device in response to a request to authenticate the view switch component received from the source virtual machine;
switching, by the source virtual machine using the view switch component, to the secure memory view without a virtual machine exit event in response to authenticating the view switch component; and
accessing, by the source virtual machine, the shared memory segment in response to switching to the secure memory view;
wherein configuring the secure memory view to access the shared memory segment comprises configuring the secure memory view to access the shared memory segment established by the virtual machine monitor.

16. The method of claim 15, further comprising:
registering, by the source virtual machine, a second shared memory segment with the virtual machine monitor, wherein configuring the secure memory view to access the shared memory segment further comprises configuring the secure memory view to access the second shared memory segment registered by the source virtual machine and wherein accessing, by the target virtual machine, the shared memory segment further comprises accessing, by the target virtual machine, the second shared memory segment;
generating, by the source virtual machine, a shared buffer to be processed by the target computing device, wherein the second shared memory segment includes the shared buffer;
processing, by the target virtual machine, the shared buffer in response to accessing the shared memory segment; and
coordinating, by the target virtual machine and the source virtual machine, ownership of the shared buffer using a secure view control structure stored in the shared memory segment established by the virtual machine monitor.

17. One or more non-transitory, computer-readable storage media comprising a plurality of instructions that in response to being executed cause a computing device to:
authenticate, by a virtual machine monitor of the computing device, a view switch component of a target virtual machine of the computing device in response to a request to authenticate the view switch component received from the target virtual machine;

configure, by the virtual machine monitor in response to authenticating the view switch component, a secure memory view to access a shared memory segment of the computing device in response to a request to access the shared memory segment received from the target virtual machine, wherein the secure memory view defines a physical memory map of the computing device;

switch, by the target virtual machine using the view switch component, to the secure memory view without a virtual machine exit event in response to the request to access the shared memory segment; and access, by the target virtual machine, the shared memory segment in response to switching to the secure memory view.

18. The one or more non-transitory, computer-readable storage media of claim 17, wherein:

the shared memory segment comprises one or more physical memory pages of the computing device; and to configure the secure memory view comprises to configure an extended page table of the computing device.

19. The one or more non-transitory, computer-readable storage media of claim 17, wherein the shared memory segment comprises guest physical memory pages of a source virtual machine of the computing device, the one or more computer-readable storage media further comprising a plurality of instructions that in response to being executed cause the computing device to:

register, by the source virtual machine, the shared memory segment with the virtual machine monitor;

wherein to configure the secure memory view to access the shared memory segment comprises to configure the secure memory view to access the shared memory segment registered by the source virtual machine.

20. The one or more non-transitory, computer-readable storage media of claim 17, further comprising a plurality of instructions that in response to being executed cause the computing device to:

establish, by the virtual machine monitor, the shared memory segment;

authenticate, by the virtual machine monitor, a view switch component of a source virtual machine of the computing device in response to a request to authenticate the view switch component received from the source virtual machine;

switch, by the source virtual machine using the view switch component, to the secure memory view without a virtual machine exit event in response to authenticating the view switch component; and access, by the source virtual machine, the shared memory segment in response to switching to the secure memory view;

wherein to configure the secure memory view to access the shared memory segment comprises to configure the secure memory view to access the shared memory segment established by the virtual machine monitor.

21. The one or more non-transitory, computer-readable storage media of claim 20, further comprising a plurality of instructions that in response to being executed cause the computing device to:

register, by the source virtual machine, a second shared memory segment with the virtual machine monitor, wherein to configure the secure memory view to access the shared memory segment further comprises to configure the secure memory view to access the second shared memory segment registered by the source virtual machine and wherein to access, by the target virtual machine, the shared memory segment further comprises to access, by the target virtual machine, the second shared memory segment;

generate, by the source virtual machine, a shared buffer to be processed by the target computing device, wherein the second shared memory segment includes the shared buffer;

process, by the target virtual machine, the shared buffer in response to accessing the shared memory segment; and coordinate, by the target virtual machine and the source virtual machine, ownership of the shared buffer using a secure view control structure stored in the shared memory segment established by the virtual machine monitor.

22. A computing device for secure inter-virtual-machine shared memory communication, the computing device comprising:

means for authenticating, by a virtual machine monitor, a view switch component of a target virtual machine of the computing device in response to a request to authenticate the view switch component received from the target virtual machine;

means for configuring, by the virtual machine monitor in response to authenticating the view switch component, a secure memory view to access a shared memory segment of the computing device in response to a request to access the shared memory segment received from the target virtual machine, wherein the secure memory view defines a physical memory map of the computing device;

means for switching, by the target virtual machine using the view switch component, to the secure memory view without a virtual machine exit event in response to the request to access the shared memory segment; and means for accessing, by the target virtual machine, the shared memory segment in response to switching to the secure memory view.

23. The computing device of claim 22, wherein:

the shared memory segment comprises one or more physical memory pages of the computing device; and the means for configuring the secure memory view comprises means for configuring an extended page table of the computing device.

24. The computing device of claim 22, wherein the shared memory segment comprises guest physical memory pages of a source virtual machine of the computing device, the computing device further comprising:

means for registering, by the source virtual machine, the shared memory segment with the virtual machine monitor;

wherein the means for configuring the secure memory view to access the shared memory segment comprises means for configuring the secure memory view to access the shared memory segment registered by the source virtual machine.

25. The computing device of claim 22, further comprising:

means for establishing, by the virtual machine monitor, the shared memory segment;

means for authenticating, by the virtual machine monitor, a view switch component of a source virtual machine of the computing device in response to a request to authenticate the view switch component received from the source virtual machine;

means for switching, by the source virtual machine using the view switch component, to the secure memory view without a virtual machine exit event in response to authenticating the view switch component; and means for accessing, by the source virtual machine, the shared memory segment in response to switching to the secure memory view;

wherein the means for configuring the secure memory view to access the shared memory segment comprises means for configuring the secure memory view to access the shared memory segment established by the virtual machine monitor.

* * * * *